United States Patent [19]

Klingenstein et al.

[11] Patent Number: 4,748,353

[45] Date of Patent: May 31, 1988

[54] HAND TOOL FOR CLOCKWISE AND COUNTERCLOCKWISE ROTATIONS

[75] Inventors: Klaus Klingenstein, Leinfelden-Echterdingen; Werner Rieker, Waldenbuch; Günter Schaal, Stuttgart, all of Fed. Rep. of Germany

[73] Assignee: Robert Bosch GmbH, Stuttgart, Fed. Rep. of Germany

[21] Appl. No.: 840,647

[22] Filed: Mar. 17, 1986

[30] Foreign Application Priority Data

Jul. 10, 1985 [DE] Fed. Rep. of Germany ....... 3524614

[51] Int. Cl.$^4$ .............................................. H02K 7/14
[52] U.S. Cl. ................... 310/50; 310/68 A; 310/71; 310/230; 310/239; 200/1 V
[58] Field of Search ............. 310/239, 43, 241, 240, 310/47, 50, 42, 71, 229, 231, 230, 242, 68 A, 248, 68 E, 254, 89, 258, 237; 318/292, 17; 200/1 V, 157

[56] References Cited

U.S. PATENT DOCUMENTS

| | | | |
|---|---|---|---|
| 1,808,747 | 6/1931 | Apple | 310/239 |
| 3,440,465 | 4/1969 | Pratt | 310/230 |
| 3,903,442 | 9/1975 | Krulls | 310/241 |
| 4,342,931 | 8/1982 | Grossmann | 310/50 |
| 4,348,603 | 9/1982 | Huber | 310/68 A |
| 4,401,908 | 8/1983 | Cabaussel | 310/229 |
| 4,536,669 | 8/1985 | Morishita | 310/230 |
| 4,587,384 | 5/1986 | Yacobi | 310/68 A |
| 4,593,220 | 6/1986 | Cousins | 310/71 |

FOREIGN PATENT DOCUMENTS

| | | | |
|---|---|---|---|
| 0498233 | 12/1953 | Canada | 310/68 A |
| 0557240 | 5/1958 | Canada | 310/241 |

Primary Examiner—R. Skudy
Attorney, Agent, or Firm—Michael J. Striker

[57] ABSTRACT

A hand machine tool for clockwise and counterclockwise rotation includes a universal electric motor and a reversing switch. The reversing switch is comprised of a contact plate and a contact holder both provided with coupling elements for coupling the contact plate and the contact holder for limited relative rotation. The coupling elements of the contact plate and the contact holder enclose a dust-sealed chamber in which contacts are accommodated.

10 Claims, 4 Drawing Sheets

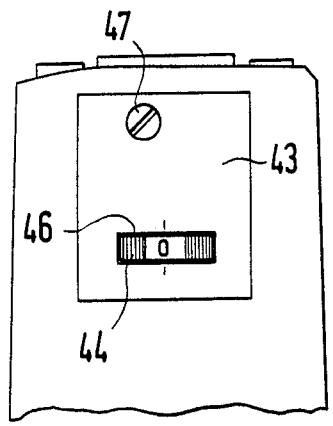
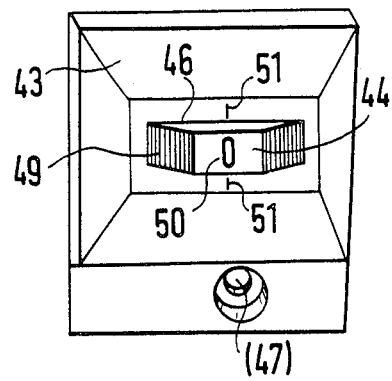
FIG.3  FIG.4
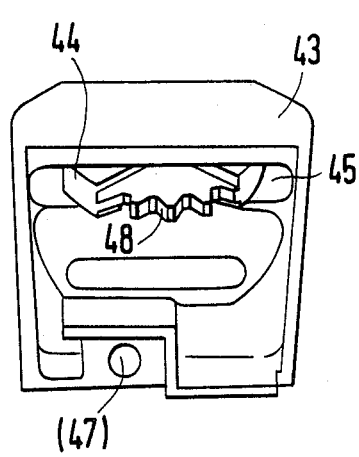
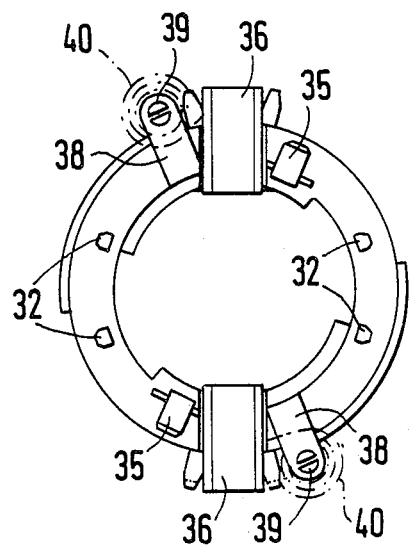
FIG.5  FIG.6

HAND TOOL FOR CLOCKWISE AND COUNTERCLOCKWISE ROTATIONS

BACKGROUND OF THE INVENTION

The present invention relates to a hand tool of the type in which motor can rotate in clockwise and counterclockwise directions and which includes a device for the displacement of brushes wiping on a collector.

In the hand tools of the foregoing type, displacements of the brushes are performed by switching over of the direction of the armature of the motor in order to obtain an output comparable with that of the universal motors with reversing directions of rotation. Expensive devices have been employed for the displacement of the brushes, in which devices hand-laid and hand-connected conduits have been required. The universal electric motors provided with such devices have not been, however, suitable for mass production.

SUMMARY OF THE INVENTION

It is an object of the present invention to provide an improved hand-held machine tool.

It is a further object of this invention to provide a machine tool which would be suitable for mass production.

These and other objects of the invention are attained by a hand machine tool for clockwise and counterclockwise rotation, comprising a universal electric motor provided with a device for displacing brushes wiping on a collector, said device being a switch including two holding elements of insulating material, said holding elements being connectable to each other and rotatable relative to each other within certain limits, said holding elements carrying at sides of the connection thereof contacts which come into contact with each other upon rotation of said holding elements one against the other for reversing a direction of rotation of the universal motor, one of said holding elements being a contact holder for connection contacts for an external connection of the machine tool and contact elements for four pole shoe connection contacts, and the other of said holding elements being a contact plate carrying carbon brush holders.

The switch made of two parts formed of insulating material and connectable to each other so that they can be rotated in opposite directions within a certain range makes it possible that contacts can be easily exchanged at the side of connection, and, at the same time, the assembling of the reversing switch and of the motor would be substantially facilitated.

The contact holder and said contact plate may be provided respectively with collars engaging with each other, said collars forming a hollow space in which said contacts for reversing the direction of rotation are positioned and are alternatively connectable with each other.

The contact holder may have four of said contact elements which are contact lugs adapted to be plugged into four contact pockets, respectively, of the pole shoe connection contacts in a direction of elongation of a stator of the universal motor so that the contact holder is mounted on a stator of the universal motor.

The contact plate may also carry a brush counter pressure spring.

The collars may be, at least partially, formed as locking elements which hold together said contact plate and said contact holder.

It is particularly advantageous that the collars enclose the above mentioned hollow space for exchangeable contacts in a dust-sealing manner because this substantially increases life span of the machine tool.

The machine tool may include a housing into which said motor with said reversing switch are inserted, said housing having an open connection flange, said connection contacts being sufficiently long so that they extend through said flange and are accessible through said flange when said motor and said switch are inserted into the housing.

The contact plate may have at a periphery thereof near said brush holders a plurality of teeth, said housing having an opening providing an access to said brush holders, and a cover plate for closing said opening, said cover plate supporting an adjustment member having teeth adapted to engage with the teeth of said contact plate, said adjustment member being held in a slot of said cover plate and having a grip portion extended outwardly from said cover plate.

The adjustment member may be a wheel having said grip portion and provided with at least one marking.

The cover plate may have, in the region of said slot, a depression which supports said adjustment member.

The contact plate may have a ring-shaped recess forming said hollow space, said recess being provided at an end face of the contact plate facing said contact holder, said contact plate further having a plurality of slots extending from a base of said recess to another end face of the contact plate, said contacts on said contact plate being resilient strips and having connecting tongues extending through said slots and being bent over said contact plate to be connected thereto, said resilient strips further having contact lugs two of which are positioned in said recess.

Both holding elements may include locking means at the sides of the connection thereof, said locking means ensuring various rotation positions of said holding elements relative to each other.

Said locking means can ensure positions of said switch in the clockwise and counter-clockwise rotations and also in a neutral position in which an electric circuit through coal brushes in said coal brush holders is interrupted.

The limited rotation of the two holding elements relative to each other also serves for the displacement of the brushes and for alternating contact during the reversing from the clockwise direction to the counterclockwise direction and vice versa.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a partial side view of the housing of FIG. 2 with a cover plate covering the above mentioned opening;

FIG. 4 is a perspective view of the cover plate of FIG. 3, seen from the internal side of the housing;

FIG. 5 is a perpsective view which is similarly to FIG. 4 seen from the internal side of the housing;

FIG. 6 is a top plan view of the contact plate forming the one part of the switch;

DETAILED DESCRIPTION OF THE PREFERRED EMBODIMENTS

Figure 1:
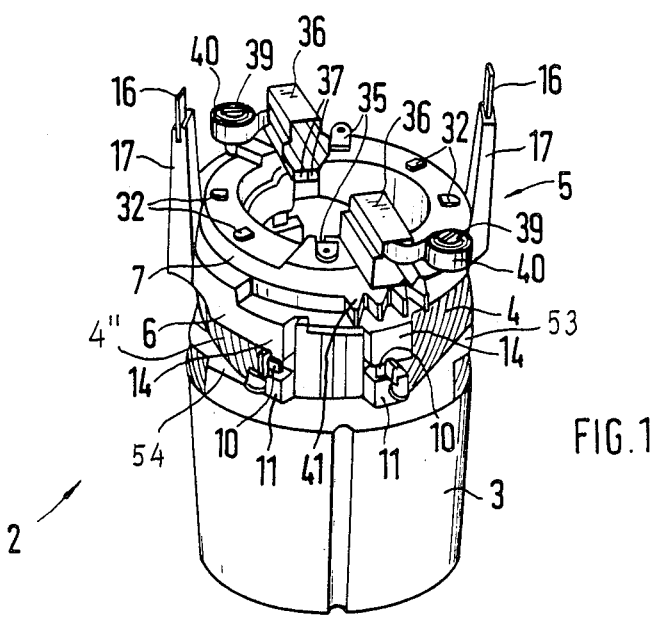
FIG. 1 is a perspective view of the stator of a hand machine tool according to the invention, with a universal motor and a two-part switch for switching a direction of rotation.
Figure 2:
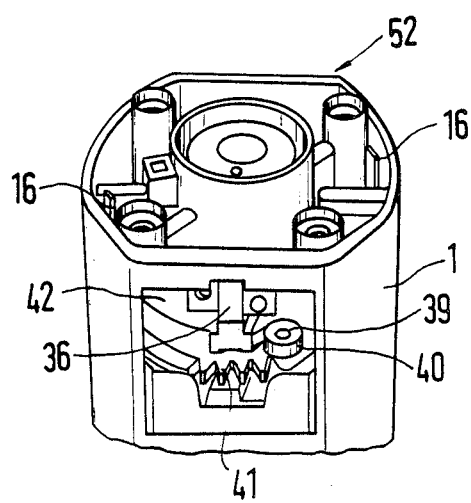
FIG. 2 is a partial perspective view of the housing of the hand machine tool of the invention, with a rectangular opening which makes possible an access to the wiper holders of the inserted universal motor.
Figure 7:
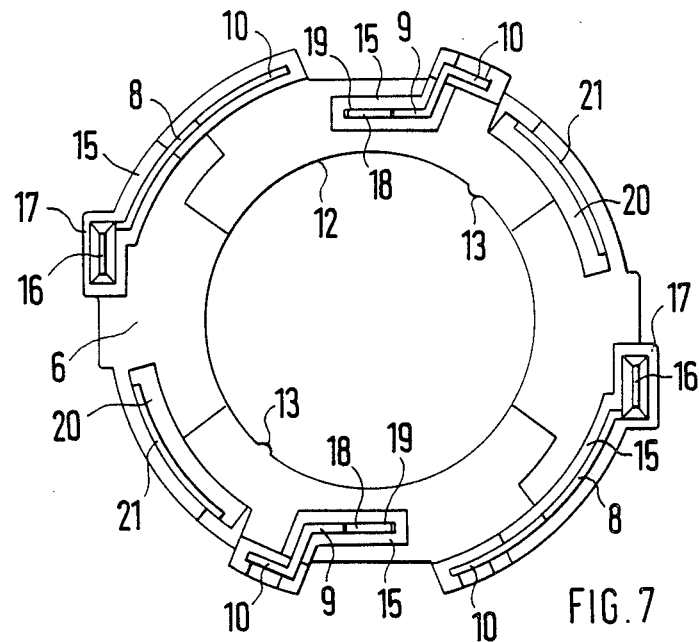
FIG. 7 is a top plan view of the contact holder forming the second part of the switch.
Figure 8:
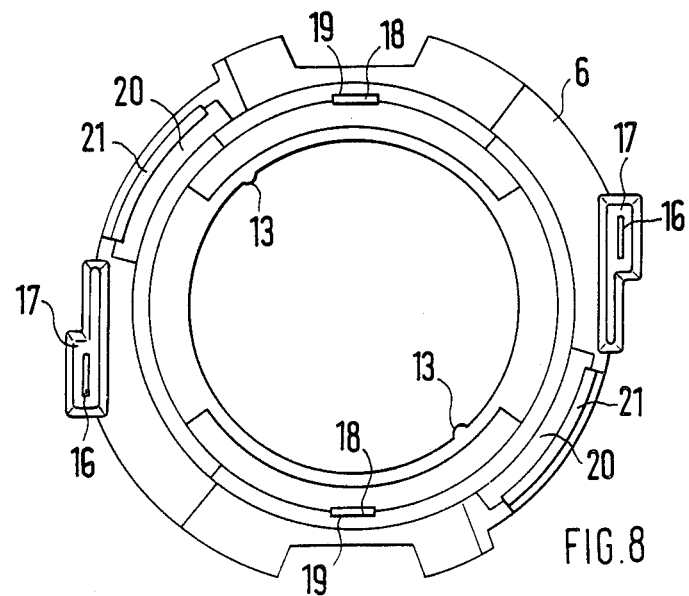
FIG. 8 is a plan view of the contact holder of FIG. 7 as seen from the opposite side.

Referring now to the drawings in detail, and firstly to FIGS. 1 and 2, these figures show a universal electric motor 2 which is inserted into a housing 1 of the hand tool. The universal electric motor 2 has a stator 3 with coils 4, 4', 4" and pole shoes 53, 54. A switch 5 is inserted at the connection end face of the stator 3. The reversing switch 5 is comprised of two holding elements, namely a contact holder 6 and a contact plate 7. The contact holder 6 as seen in FIG. 7, has four sheet-like contacts 8 and 9 which are inserted at the end face of the holder and terminate with four contact lugs 10, respectively. These lugs 10 can engage into respective contact pockets 11 of the pole shoes 53, 54 of the stator 3 facing the contact holder 6. The contact holder 6 as shown in FIG. 1 is formed substantially as a ring, the inner cylindrical surface 12 of which has locking projections 13. While four contact lugs 10 are held in the socket-like projections 14 (FIG. 1) of the contact holder the remaining portions of contacts 8 and 9 extend approximately in the circumferential direction in circular walls 15 towards the opposite end face of the contact holder 6. The contacts 8 terminate at their ends facing away from the contact lugs 10 with lugs 16 as shown in FIGS. 1 and 7 which pass through guides 17 provided on the contact holder 6 up to the non-shown housing part. The ends of contact lugs have holding tongues 18 with wiper contacts which extend through respective recesses 19 in a movement range of a resilient strip as will be described in detail below. Tongues 18 are clearly shown in FIGS. 7 and 8.

Figure 9:
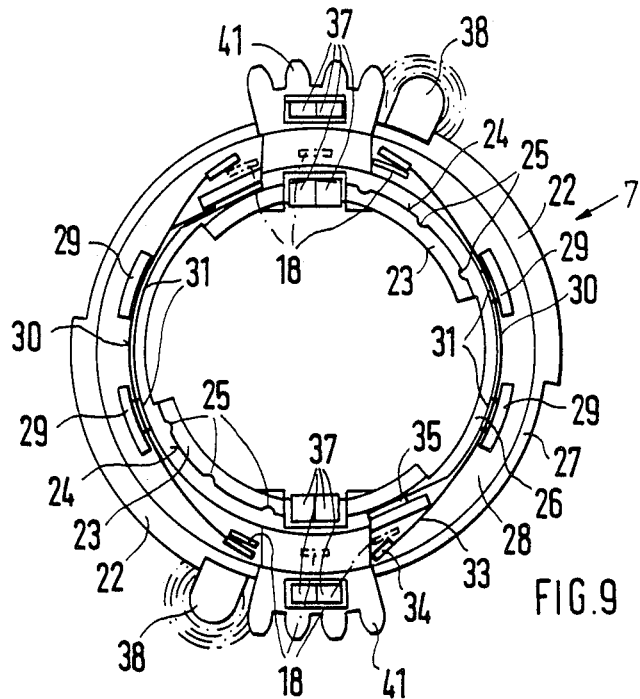
FIG. 9 is a plan view of the contact plate of FIG. 6 as seen from the opposite side.

A perforation 20 formed on the contact holder 6 provides locking edges or projections 21 which cooperate with projections 22 formed on the contact plate 7. The projections 21, 22 as well as projection 23 provided on the contact plate 7 are formed as means for connecting the contact plate 7 with the contact holder 6. Projections 21 are clearly seen in FIGS. 7, 8 and 11 whereas projections 23 as well as the aformentioned projections 22 are seen in FIG. 9. Thereby the outer cylindrical faces 24 of projections 23 cooperate with the inner cylindrical surface 12 of the contact holder 6. Locking recesses 25 provided in the outer cylindrical faces 24 of projections 23 cooperate with the locking projections 13.

Figures 10, 11:
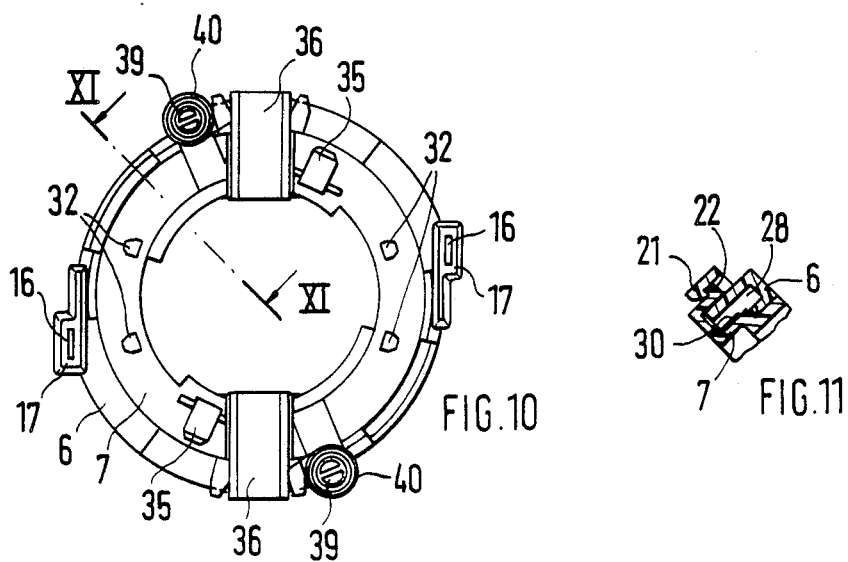
FIG. 10 is a switch in the assembled condition.
FIG. 11 is a sectional view taken along line XI—XI of FIG. 10.

Projections 26 and 27 of contact plate 7 as shown in FIG. 9, form a limitation in a circumferential direction for an annular space 28. Holding tongues 29 for two resilient contact bands 30 are positioned in the annular space 28. The back wall of the annular space 28 has in the regions between the collars 23 and the holding tongues 29 slots 31. The contact strips 30 have connecting tongues 32 shown in FIG. 10, which extend through those slots 31 and can be bent at the back side of the contact plate 7. The end of each contact strip 30 is subdivided into a contact tongue 33 with a wiper contact 34 and a contact lug 35. The contact lugs 35 of the contact strips 30 are eventually guided through the slots in the contact plate 7 outwardly. Each contact lug 35 serves as a connection contact for a non-illustrated carbon brush which can be supported in a carbon brush holder 36 shown in FIG. 10 illustrating the contact holder and the contact plate in assembly.

Two carbon brush holders 36 are mounted to the contact plate 7 by means of lugs 37. Near the carbon brush holders 36, the contact plate 7 has bearings 38 with bearing pins 39 for spiral springs 40. The free end of each spiral spring presses against the backside of the respective carbon brush. Below the carbon brush holders 36, has the contact plate 7 two toothed segments 41 as shown in FIG. 9. The toothed segments 41 are accessible via an opening 42 provided in the housing 1 of the universal electric motor 2.

For closing the opening 42 which also make possible an exchange of carbon brushes a cover plate 43 is provided. With reference to FIGS. 3 and 4 it will be seen that at least one adjustment wheel 44 is provided in the device, for which the cover plate 43 serves as a support. For this purpose the cover plate has a holow or depression 45 (FIG. 5) which merges into a slot 46. A bolt 47 serves to connect the cover plate 43 to the housing. The adjustment wheel 44 has a toothed segment 48 the teeth of which pass into or cooperate with the teeth of the toothed segments 41 of the contact plate 7. The portion of the adjustment wheel 44, extending outwardly is provided with a gripping flange 49 and a zero marking 50. The dash markings 51, provided adjacent to the slot 46, serve as adjusting markings for the zero marking 50. A connection flange of the motor housing is designated by reference numeral 52. This connection flange which is shown in FIG. 2 in detail has a perforation through which the lugs 16 for the connections of the main switch are accessible from the outside.

The rotation direction reversing switch 5 is comprised of the two complementing parts which are the contact holder 6 and the contact plate 7. Collars 23 of contact plate 7 fit in the inner cylindrical surface 12 of the contact holder and the both parts are axially pressed against each other so that the locking edges 21 are locked at the projections 22. This can be best seen in FIG. 11. Thereby the contact holder 6 and the contact plate 7 are connected for rotation in opposition with one another within certain limits. Both external locking recesses 25 in the collars 23 define in cooperation with the locking projections 13 of the contact holder 6 two positions in which the rotation reversing switch 5 is optimally adjusted to the respectively selected direction of rotation of the motor. The middle locking recesses 25 define the middle position of the rotation direction reversing switch 5 which leads to the fact that the universal motor 2 can not be set in operation. The assembled rotation direction reversing switch 5 is connected with the stator 3 of the universal motor 2 so that contact lugs 10 of the switch are plugged into the respective contact pockets 11 of the pole shoes of the stator 3. The so-assembled universal motor 2 can be inserted into the housing 1. Thereby lugs 16 are engaged through the perforations in the connection flange 52 of the housing. Lugs 16 are accessible from outside for the connection of the main switch of the hand-held tool.

The toothed segments 41 of the contact plate 7 are positioned behind the opening 42 of the housing 1 when the universal motor 2 is inserted into the housing. The carbon brush holders 36 are also accessible through the opening 42 so that they can be exchanged if necessary. The cover plate 43 or at least one of the plurality of such cover plates insertable into opening 42 can be plugged into this opening such that the toothed segment 48 of the adjustment wheel 44 supported in the cover plate comes into engagement with one of the toothed segments 41 of the contact plate 7. After the screwing of the cover plate 43 to the housing wall by the bolt 47, the adjustment wheel 44 is adjusted by means of the gripping flange 49. The zero marking 50 or marking dash 51 permit the reading of the respectively adjusted direction of rotation.

The above described manner of connecting of the reversing switch to the motor provides for an easy assembling and simple manufacturing of the structural components of the device according to the invention. The proposed hand tool has actually unlimited service life and contact safety which are obtained due to the fact that the contact holder 6 and the contact plate 7 form the dust-sealed annular space or chamber 28 in which holding tongues 18 and strips 30 are accommodated.

It will be understood that each of the elements described above, or two or more together, may also find a useful application in other types of hand tools differing from the types described above.

While the invention has been illustrated and described as embodied in a hand tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a hand machine tool capable of rotation in two opposite directions, comprising a universal electric motor having a stator and provided with a device for displacing carbon brushes which wipe on a collector of the motor, the improvement comprising said device being a changeover switch (5) including two holding elements of insulating material, one of said holding elements carrying carbon brush holders (36) for holding said carbon brushes and another of said holding elements being connectable with the stator of said motor, said stator having four pole shoe connection contacts (11), said holding elements (6, 7) being connectable to each other and rotatable relative to each other within certain limits, said holding elements (6, 7) carrying at sides of the connection thereof respective contacts (18, 30) which come into contact with each other upon rotation of said holding elements one against the other, one of said holding elements being a contact holder carrying connection contacts (16) and contact elements (10) engageable into the four pole shoe connection contacts (11) of said stator, and the other of said holding elements being a contact plate (7) which carries said carbon brush holders (36); housing means (1, 43) accommodating said motor with said switch, said housing means having an open connection flange (52), said connection contacts (16) being sufficiently long so that they extend through said open connection flange and are accessible through said flange when said motor and said switch are inserted into the housing means, said contact plate (7) having at a periphery thereof near said brush holders (36) a plurality of teeth (41), said housing means having an opening (42) providing an access to said brush holders, said housing means having a slot (46); and an adjustment member (44) supported in said housing means and having teeth adapted to engage with the teeth of said contact plate, said adjustment member being held in said slot (46) and having a grip portion extended outwardly from said housing means.

2. The machine tool as defined in claim 1, wherein said contact holder and said contact plate are provided, respectively with projections wherein the projections on said contact holder are engageable with the projections on said contact plate, the projections on said contact plate forming therebetween an annular space (28) in which said contacts are positioned and are alternatively connectable with each other.

3. A machine tool as defined in claim 1, wherein said contact holder has four contact lugs (10) adapted to be plugged into said four pole shoe connection contacts in a direction of elongation of the stator (3) of the universal motor so that the contact holder is mounted on the stator of the universal motor, said pole shoe connection contacts being contact pockets.

4. The machine tool as defined in claim 1, wherein said contact plate carries spiral springs (40).

5. The machine tool as defined in claim 2, wherein said projections on said contact plate and said holder are at least partially formed as locking elements which hold together said contact plate and said contact holder upon rotation thereof relative to each other.

6. The machine tool as defined in claim 1, wherein said adjustment member is a wheel having said grip portion and provided with at least one marking.

7. The machine tool as defined in claim 1, wherein said housing means include a housing and a cover plate which has said slot and closes said opening and further has a depression (45) which supports said adjustment member.

8. The machine tool as defined in claim 2, wherein said annular space (28) is provided at an end face of the contact plate facing said contact holder, said contact plate further having a plurality of slots (31), said contacts (30) being resilient strips and having connecting tongues (32) extending through said slots and being bent over said contact plate to be connected thereto, said resilient strips having further contact lugs (35) two of which are positioned in said annular space (28).

9. The machine as defined in claim 1, wherein said holding elements include locking means (13, 25) at the sides of the connection thereof, said locking means ensuring various rotation positions of said holding elements relative to each other.

10. The machine tool as defined in claim 9, wherein said locking means can ensure positoins of said switch in each direction of rotation and also in a neutral position in which an electric circuit through carbon brushes in said carbon brush holders is interrputed.

* * * * *